2,744,087

POLYESTER FROM TEREPHTHALIC ACID, ETHYLENE GLYCOL AND POLYETHYLENE GLYCOL

Mark D. Snyder, Harriman, Tenn., assignor to E. I. du Pont de Nemours and Company, Wilmington, Del., a corporation of Delaware No Drawing. Application December 11, 1951,
Serial No. 261,150

5 Claims. (Cl. 260—75)

This invention relates to a modified polyethylene terephthalate having improved dyeing properties.

The production of the novel class of fiber-forming linear polyesters of terephthalic acid and a glycol of the series $HO(CH_2)_nOH$ where $n$ is an integer from 2 to 10, inclusive, is fully disclosed in U. S. Patent 2,465,319. From a commercial standpoint one of the most interesting polymers of this class is polyethylene terephthalate. However, for all of its desirable characteristics, this polymer does suffer by possessing a relatively poor affinity for the most commonly used dyes under the conditions normally employed for dyeing.

One approach to this problem has been to prepare copolymers of polyethylene terephthalate with other polymer-forming materials which possess a high affinity for the dye-stuffs commonly used in the trade. Of the hundreds of copolymers prepared, only one class has shown improved dyeing properties without simultaneously showing a severe retrogression in the physical properties such as resiliency, tenacity and softening temperature.

It is an object of this invention to provide a copolyester of polyethylene terephthalate which will show improved dyeing properties. It is a further object of this invention to provide a readily dyeable copolyester which will have physical properties equivalent or nearly equivalent to those possessed by the unmodified polyethylene terephthalate. Other objects will become apparent in the description of the invention and in the claims.

The objects of this invention are accomplished by subjecting dimethyl terephthalate, ethylene glycol and a polyethylene glycol as defined below to an ester interchange reaction followed by polymerization to produce a copolyester. The polyethylene glycol may be any of the compounds described by the formula:

$$HO-(CH_2)_2-(O-CH_2-CH_2-)_n-O-(CH_2)_2-OH$$

where $n$ is an integer varying from 1 to 135 or even more. The polyethylene glycol may have a single molecular weight, it may be a blend of a low and a high molecular weight compound, or it may be a blend of several compounds of graduating molecular weight. It is preferred, however, that the polyethylene glycol be a pure polymer or a mixture of such polymers having a relatively narrow range of molecular weights. The amount of polyethylene glycol based on the weight of the dimethyl terephthalate may range up to about 10% without too seriously affecting the physical properties of the resulting copolymer, but to get the best balance of physical properties and dyeing properties, it is preferred to employ polyethylene glycols in amounts ranging from about 1 to about 5%.

The ester interchange reaction and the polymerization reaction are carried out essentially as described in U. S. Patent 2,534,028. The ethylene glycol and the dimethyl terephthalate react to form bis-$\beta$-hydroxyethyl terephthalate and in the presence of the polyethylene glycol some of the methanol residues of the dimethyl terephthalate are replaced with polyethylene glycol residues. It may thus be observed that the resulting product is a mixture containing bis-$\beta$-hydroxyethyl terephthalate, the symmetrical ester formed from two mols of the polyethylene glycol and 1 mol of dimethyl terephthalate and the unsymmetrical ester formed from one mol of ethylene glycol, one mol of polyethylene glycol and one mol of dimethyl terephthalate. This ester interchange reaction is brought about in the presence of a catalyst, e. g., litharge in a concentration ranging from .005% up to 1% by heating the ingredients in a vessel adapted for distillation at a temperature between 140° C. and 220° C. and preferably between 150° C. and 200° C. The reaction may be carried out under pressures above or below atmospheric pressure if desired. However, it can be readily seen that an economic advantage resides in conducting the reaction at atmospheric pressure. The volatile product of the reaction, methanol, is taken off overhead and forces the ester interchange reaction to completion.

The subsequent polymerization reaction may be effected in either the liquid (i. e., the melt) or solid phase. In the liquid phase the reaction is carried out at reduced pressure in the vicinity of .05 to 20 millimeters of mercury with the range .05 to 5.0 millimeters of mercury preferred for optimum results. At this reduced pressure the free ethylene glycol which emerges from the polymer as a result of the condensation reaction is removed. The reaction mixture is very viscous. If the free ethylene glycol is not substantially removed, it is not possible to form a fiber-forming polymeric material, but rather a low molecular weight polymer too brittle for fibers results. A temperature between about 230° C. to 290° C. and preferably between about 260° C. to about 275° C. is maintained during the polymerization step. Since low temperatures necessitate an excessive length of time, the higher temperatures within the preferred range will generally be used in the commercial operation. The ethylene glycol and polyethylene glycol residues in the polymer chain will be, of course, of random distribution.

The ester interchange portion of the reaction usually takes from one to five hours. The polymerization cycle, however, may take longer, generally being one to 30 hours after a full vacuum has been achieved. The actual length of time required varies, of course, with catalyst concentration, temperature, intrinsic viscosity desired, amount of color allowable in the finished polymer, degree of vacuum obtained and many other such items. In general, it is desired not to have too long a polymerization cycle, both for economic reasons and for the reason that if the polymerization cycle is too long, the competing and irreversible thermal degradation reaction will have sufficient time to lower the intrinsic viscosity more than the polymerization reaction can raise it.

The following examples illustrate the preparation of the copolyesters of this invention. Parts and percentages are by weight unless otherwise indicated.

The copolyesters were prepared by the general procedure of taking 1910 grams of dimethyl terephthalate, 2010 grams ethylene glycol, 0.2 gram of lead oxide, and the weight of the given polyethylene glycol shown in Table I. The respective ingredients for each copolymer were put into a round bottomed Claisen distilling flask made of glass which was heated to 190° C. for 1 to 5 hours until the theoretical quantity of methanol had been distilled off. The resulting product was then transferred to a stainless steel autoclave. This autoclave was evacuated to a pressure of .05 to 1 millimeter mercury, and the temperature raised to 260° C., the entire mixture being agitated by bubbling oxygen-free nitrogen through the molten mass. The polymerization reaction was continued with the elimination of ethylene glycol for a sufficient length of time to give a polymer having an intrinsic viscosity in the range of 0.48 to 0.62. In Table I, there are also shown the important physical properties of the resulting copolymers.

Table I

| Item | Avg. M.W. of PEG [1] | Percent PEG | Grams PEG | $[\eta]$ [2] | S.P. °C. [3] | T. [4] | Percent E. [5] |
|---|---|---|---|---|---|---|---|
| 1 | 150 | 2.5 | 47.7 | 0.58 | 247 | 2.8 | 61 |
| 2 | 150 | 3.5 | 66.8 | 0.58 | 243 | 2.8 | 61 |
| 3 | 400 | 2.0 | 38.2 | 0.51 | 248 | 2.7 | 65 |
| 4 | 400 | 3.5 | 66.8 | 0.52 | 246 | 2.8 | 61 |
| 5 | 400 | 7.0 | 133.7 | 0.55 | 238 | 2.7 | 58 |
| 6 | 1,000 | 3.5 | 66.8 | 0.53 | 250 | 2.8 | 63 |
| 7 | 1,540 | 2.0 | 38.2 | 0.56 | 252 | 2.6 | 57 |
| 8 | 1,540 | 3.5 | 66.8 | 0.50 | 251 | 2.6 | 68 |
| 9 | 1,540 | 7.0 | 133.7 | 0.48 | 248 | 2.5 | 72 |
| 10 | 4,000 | 3.5 | 66.8 | 0.57 | 251 | 2.9 | 67 |
| 11 | 6,000 | 3.5 | 66.8 | 0.62 | 253 | 2.4 | 66 |
| 12 | Control [6] | None | None | 0.57 | 254 | 2.8 | 55 |

[1] Polyethylene glycol.
[2] Intrinsic viscosity of the polyester.
[3] Softening point of the polyester.
[4] Tenacity in grams per denier of the corresponding yarn.
[5] Elongation in percent of the corresponding yarn at break.
[6] Polyethylene terephthalate.

The expression, "intrinsic viscosity," denoted by the symbol $[\eta]$ is used herein as a measure of the degree of polymerization of the polyesters and may be defined as $$\text{limit } \frac{l_n \eta_r}{C} \text{ as } C \text{ approaches } 0$$

wherein $\eta_r$ is the viscosity of a dilute solution of the polyester (in a solvent composed of 7 parts by weight of trichlorophenol and 10 parts by weight of phenol) divided by the viscosity of the solvent mixture per se measured in the same units and the same temperature, and C is the concentration in grams of polyester per hundred cubic centimeters of solution.

These copolyesters were spun by the conventional melt spinning method by heating a quantity of the highly polymeric copolyester to a temperature of about 280° C. and extruding through a 23-hole spinneret. The yarn was wound up at 600 yards per minute and drawn over a hot pin at 80° C. at a draw ratio to give a yarn elongation at the break of between 50 and 70%. A 23-filament yarn of approximately 70 denier was obtained. The yarns were knit on a circular knitting machine into tubing which was then boiled off according to the customary technique and tested for dye affinity. The results are given in Table II.

Table II

| Average Molecular Weight of Polyethylene Glycol Used in Polymerization | Weight Percent Added | Dye Affinity [1] for Acetate Dyes of Resultant Polymer |
|---|---|---|
| 150 | 2.5 | 2.0 |
| 400 | 2 | 3.1 |
| 400 | 3 | 3.6 |
| 400 | 5 | 4.6 |
| 1,000 | 3 | 4.2 |
| 4,000 | 3 | 3.5 |
| 6,000 | 3 | 2.5 |
| Control [2] | None | 1.0 |

[1] Based on light shades. Dark shades are not commercially possible on straight polyethylene terephthalate by this standard dyeing technique. Dark shades on the copolymers of this invention are very favorable.
[2] Polyethylene terephthalate.

In determining the level of dye affinity, dyeings were made with both acetate dyes and vat dyes. With acetate dyes, the dye affinity was determined by dyeing to a predetermined light shade by using the minimum concentration of dye in the dye bath to produce the given shade for a dyeing cycle of a given time. These dye bath concentrations varied from 1 to 5%. The dye affinities shown in Table II are obtained by multiplying the reciprocal of the dye bath concentration by 5 so as to relate all the numbers to a value of 1 for the control. The dyeings were performed by employing the given concentration of dye in an aqueous bath containing 50 grams of water for each gram of fabric to be dyed and 3% of a dispersing agent such as "Alkanol" DW (the sodium salt of an alkyl aryl sulfonate). The dyeings were carried out at 212° F. for 60 minutes. Typical examples of the acetate dyes employed are the dyes having the following color indices: PR–228 (blue), PR–61 (red), PR–238 (red), and PR–43 (orange). The polyethylene glycols which are generally used are those having molecular weights of about 400 to about 4,000 or, in the formula above $n$ may vary from about 6 to about 89.

With vat dyes it was found that a similar sort of relationship held with respect to dye affinity as is given for the acetate dyes in Table II. In dyeing with the vat dyes, they were first reduced to the soluble leuco form by the alkaline reduction commonly employed in the art. Here again the dye affinity was determined by dyeing to a predetermined light shade by using the minimum concentration of dye in the dye bath to give this shade for the given dyeing cycle. These dye bath concentrations varied from 1 to 5%. The dye bath contained 50 grams of water for each gram of fabric but before adding the fabric the pH of the dye bath was brought to within the range of 5 to 7 by adding approximately 4.5 grams per liter of glacial acetic acid and to maintain the dye in the reduced state there was also added 10 grams per liter of "Sulfoxite" C (sodium formaldehyde sulfoxylate). The dyeings were carried out at the boil for a total of 60 minutes. Among the vat dyes employed were those having the following color indices: 1101 (green), 1105 (violet) and 196 (orange). The dyeing affinity of the copolyesters of this invention for the vat dyes was from 2 to 5 times better than the dyeing affinity of polyethylene terephthalate.

The polymeric esters of this invention are derived from terephthalic acid, ethylene glycol and polyethylene glycols of the above formula. Although these copolyesters may be produced by direct esterification of terephthalic acid with ethylene glycol and the described polyethylene glycols, it is generally preferred to carry out the reaction through ester interchange employing an ester of terephthalic acid (e. g. dimethyl terephthalate) or other of its ester forming derivatives. The copolyesters have melting or softening points above 200° C. and are readily formed into films and filaments. Orientation is accomplished readily by cold drawing, and filaments of great strength and pliability are produced upon drawing. In general, the polymers of this invention have the properties disclosed for the polymers of U. S. 2,465,319, and, in addition, they have superior dye affinity, a most important commercial advantage.

Any departure from the above description which conforms to the present invention is intended to be included within the scope of the claims.

I claim:

1. A dyeable polymeric ester derived from terephthalic acid, ethylene glycol and a polyethylene glycol having a formula $$HO-(CH_2)_2-(O-CH_2CH_2)_n-O(CH_2)_2OH$$

wherein $n$ represents an integer within the range of 1 to 135, said polymeric ester having a softening point of at least 200° C., the said polyethylene glycol being present in amount not more than 10% by weight based on the terephthalic component.

2. A dyeable polymeric ester derived from terephthalic acid, ethylene glycol and a polyethylene glycol having the formula $$HO-(CH_2)_2-(O-CH_2CH_2)_n-O(CH_2)_2OH$$

wherein $n$ represents an integer within the range 6 to 89, said polymeric ester having a softening point of at least 200° C., the said polyethylene glycol being present in amount not more than 10% by weight based on the terephthalic component.

3. A dyeable polymeric ester having a softening point of at least 200° C. capable of being shaped into articles such as films and filaments, said ester being derived from bis-β-hydroxyethyl terephthalate and a polyethylene glycol having the formula $$HO(CH_2)_2—(O—CH_2CH_2)_n—O(CH_2)_2OH$$

wherein $n$ represents an integer within the range of 1 to 135, the said polyethylene glycol being present in amount not more than 10% by weight based on the terephthalic component.

4. A dyeable polymeric ester having a softening point of at least 200° C. capable of being shaped into articles such as films and filaments, said ester being derived from reacting a polyethylene glycol with the reaction product of ethylene glycol and dimethyl terephthalate, the said polyethylene glycol being used in the reaction in amounts of about 1% to about 10% based on the weight of said dimethylterephthalate, and the said polyethylene glycol having the formula $$HO(CH_2)_2—(O—CH_2CH_2)_n—O(CH_2)_2OH$$

wherein $n$ represents an integer within the range of 1 to 135.

5. The ester of claim 1 in which the molecular weight of the polyethylene glycol is from about 400 to about 6000.

References Cited in the file of this patent

UNITED STATES PATENTS

| | | |
|---|---|---|
| 2,534,028 | Izard | Dec. 12, 1950 |
| 2,562,878 | Blair | Aug. 7, 1951 |
| 2,578,660 | Auspos et al. | Dec. 18, 1951 |